United States Patent
Samuel et al.

(10) Patent No.: US 11,915,015 B2
(45) Date of Patent: Feb. 27, 2024

(54) SYSTEMS AND METHODS FOR USE OF PRE-BOOT RESOURCES BY MODERN WORKSPACES

(71) Applicant: Dell Products, L.P., Round Rock, TX (US)

(72) Inventors: Balasingh P. Samuel, Round Rock, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 69 days.

(21) Appl. No.: 17/459,557

(22) Filed: Aug. 27, 2021

(65) Prior Publication Data

US 2023/0067647 A1    Mar. 2, 2023

(51) Int. Cl.
| | |
|---|---|
| *G06F 9/44* | (2018.01) |
| *G06F 9/445* | (2018.01) |
| *G06F 13/40* | (2006.01) |
| *G06F 1/26* | (2006.01) |

(52) U.S. Cl.
CPC ............ *G06F 9/44505* (2013.01); *G06F 1/26* (2013.01); *G06F 13/4068* (2013.01)

(58) Field of Classification Search
CPC ..... G06F 9/44505; G06F 1/26; G06F 13/4068
See application file for complete search history.

(56) References Cited

U.S. PATENT DOCUMENTS

| | | | | |
|---|---|---|---|---|
| 4,787,026 | A * | 11/1988 | Barnes | G06F 9/45533 712/34 |
| 9,448,785 | B1 * | 9/2016 | Alexeev | G06F 12/1408 |
| 2009/0204965 | A1 * | 8/2009 | Tanaka | G06F 9/45558 718/1 |
| 2012/0191960 | A1 * | 7/2012 | Piwonka | G06F 9/441 713/2 |
| 2013/0117806 | A1 * | 5/2013 | Parthasarathy | G06F 21/604 726/4 |
| 2017/0255567 | A1 * | 9/2017 | Vidyadhara | G06F 13/42 |
| 2019/0044927 | A1 * | 2/2019 | Sood | H04L 63/0435 |
| 2019/0129804 | A1 * | 5/2019 | Liu | G06F 21/6218 |
| 2019/0138729 | A1 * | 5/2019 | Blundell | G06F 11/16 |
| 2019/0278913 | A1 * | 9/2019 | Ndu | H04L 9/0841 |
| 2019/0311141 | A1 * | 10/2019 | Brehove | G06F 21/604 |

(Continued)

*Primary Examiner* — Danny Chan
(74) *Attorney, Agent, or Firm* — Fogarty LLP

(57) ABSTRACT

Systems and methods provide isolated workspaces operating on an IHS (Information Handling System) with use of pre-boot resources of the IHS that are not directly accessible by the workspaces. Upon notification of a workspace initialization, a segregated variable space, such as a segregated memory utilized by a UEFI (Unified Extensible Firmware Interface) of the IHS, is specified for use by the workspace. The segregated variable space is initialized and populated with pre-boot variables, such as UEFI variables, that are allowed for configuration by the workspace. Upon a workspace issuing a request to configure a pre-boot variable, the segregated variable space is identified that was mapped for use by the workspace. The requested pre-boot variable configuration is allowed based on whether the pre-boot variable is populated in the segregated variable space. When the requested pre-boot variable configuration is allowed, the pre-boot variable is configured on behalf of the workspace.

16 Claims, 5 Drawing Sheets

(56) References Cited

U.S. PATENT DOCUMENTS

| | | | |
|---|---|---|---|
| 2020/0250038 A1* | 8/2020 | Vidyadhara | G06F 9/441 |
| 2020/0274881 A1* | 8/2020 | Lukanov | H04L 63/105 |
| 2020/0341791 A1* | 10/2020 | Tsirkin | G06F 1/28 |
| 2021/0004239 A1* | 1/2021 | Shin | G06F 9/441 |
| 2022/0188138 A1* | 6/2022 | Akkur Rajamannar | G06F 9/5072 |

* cited by examiner

SYSTEMS AND METHODS FOR USE OF PRE-BOOT RESOURCES BY MODERN WORKSPACES

FIELD

This disclosure relates generally to Information Handling Systems (IHSs), and, more specifically, to systems and methods for managing secure use of IHS hardware by software clients operating on the IHSs.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Various types of such segregated environments are isolated by providing varying degrees of abstraction from the underlying hardware and from the operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS. In addition, each such isolated environment may operate without regard to other instances of such environments that are operating on the same IHS, including without regard to resources that are in use by the other environments operating in isolation on that same IHS.

SUMMARY

In various embodiments, Information Handling Systems (IHSs) are provided that support use of pre-boot resources of the IHS by a plurality of workspaces operating on the IHS. The IHSs may include: one or more processors; a first memory coupled to the processors, the memory storing program instructions that, upon execution by the processors, cause the IHS to run an operating system; and a second memory coupled to the processors, the memory storing program instructions that, upon execution by the processors, cause the IHS to: receive a notification of an initialization of a first workspace on the IHS, wherein the notification specifies a segregated variable space for use by the first workspace; initialize the segregated variable space and populate the segregated variable space with a plurality of pre-boot variables allowed for configuration by the first workspace; receive, from the first workspace, a request to configure a pre-boot variable of the IHS; identify the segregated variable space as being mapped for use by the first workspace; determine whether the requested pre-boot variable configuration is allowed based on the pre-boot variables in the populated segregated variable space; and when the requested pre-boot variable configuration is allowed, configure the requested pre-boot variable on behalf of the first workspace.

In additional IHS embodiments, the segregated variable space comprises a segregated memory utilized by a UEFI (Unified Extensible Firmware Interface) of the IHS. In additional IHS embodiments, the segregated variable space is populated with the pre-boot variables based on an access control list the specifies the plurality of pre-boot variables allowed for configuration by the first workspace. In additional IHS embodiments, the first workspace is limited to accessing variable information provided in the segregated variable space, and wherein other workspaces are unable to access the variable information provided in the segregated variable space. In additional IHS embodiments, the segregated UEFI memory comprises a partition of an NVRAM (nonvolatile random-access memory) utilized by the UEFI. In additional IHS embodiments, the configuration of the pre-boot variable requested by the first workspace comprises initiating a power mode supported by the IHS. In additional IHS embodiments, the configuration of the pre-boot variable requested by the first workspace comprises disabling an I/O port of the IHS. In additional IHS embodiments, the configuration of the pre-boot variable requested by the first workspace comprises initiating a privacy capability implemented by an I/O device of the IHS. In additional IHS embodiments, an update key is stored in the segregated variable space during initialization of the segregated variable space. In additional IHS embodiments, a modification to the pre-boot variables allowed for configuration by the first workspace is decrypted using the update key. In additional IHS embodiments, the modification to the pre-boot variables allowed for configuration by the first workspace is received from a remote workspace orchestration service that initialized the first workspace on the IHS.

In various additional embodiments, methods support use of pre-boot resources of an Information Handling System (IHS) by a plurality of workspaces operating on the IHS. The methods may include: receiving, from a remote workspace orchestration service, a notification of an initialization of a first workspace on the IHS, wherein the notification specifies a segregated variable space for use by the first workspace; initializing the segregated variable space and populating the segregated variable space with a plurality of pre-boot variables allowed for configuration by the first workspace; receiving, from the first workspace, a request to configure use of a pre-boot variable of the IHS; identifying the segregated variable space as being mapped for use by the first workspace; determining whether the first workspace is allowed to configure the requested pre-boot variable based on the pre-boot variables in the populated segregated variable space; and when the requested pre-boot variable configuration is allowed, configuring the requested pre-boot variable on behalf of the first workspace.

In additional method embodiments, the segregated variable space comprises a segregated memory utilized by a UEFI (Unified Extensible Firmware Interface) of the IHS. In additional method embodiments, the segregated variable space is populated with the pre-boot variables based on an access control list the specifies the plurality of pre-boot variables allowed for configuration by the first workspace. Additional method embodiments may include limiting the first workspace to variable information provided in the segregated variable space, and preventing other workspaces from accessing the variable information provided in the segregated variable space. In additional method embodiments, the configuration of the pre-boot variable requested by the first workspace comprises initiating a power mode supported by the IHS. In additional method embodiments, the configuration of the pre-boot variable requested by the first workspace comprises disabling an I/O port of the IHS. In additional method embodiments, the configuration of the pre-boot variable requested by the first workspace comprises initiating a privacy capability implemented by an I/O device of the IHS.

In various additional embodiments, systems support use of pre-boot resources of an Information Handling System (IHS) by a plurality of workspaces operating on the IHS. The systems may include: a workspace orchestration service that is remote from the IHS and that manages deployment of workspaces on the IHS; and the IHS comprising: a processor; and a memory coupled to the processor, the memory storing program instructions that, upon execution by the processor, cause the IHS to: receive, from the remote workspace orchestration service, a notification of an initialization of a first workspace on the IHS, wherein the notification specifies a segregated variable space for use by the first workspace; initialize the segregated variable space and populate the segregated variable space with a plurality of pre-boot variables allowed for configuration by the first workspace; receive, from the first workspace, a request to configure a pre-boot resource of the IHS; identify the segregated variable space as being mapped for use by the first workspace; determine whether the first workspace is allowed to configure the requested pre-boot variable based on the pre-boot variables in the populated segregated variable space; and when access to the requested pre-boot variable is allowed, configure the requested pre-boot variable on behalf of the first workspace. In some system embodiments, the segregated variable space comprises a segregated memory utilized by a UEFI (Unified Extensible Firmware Interface) of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
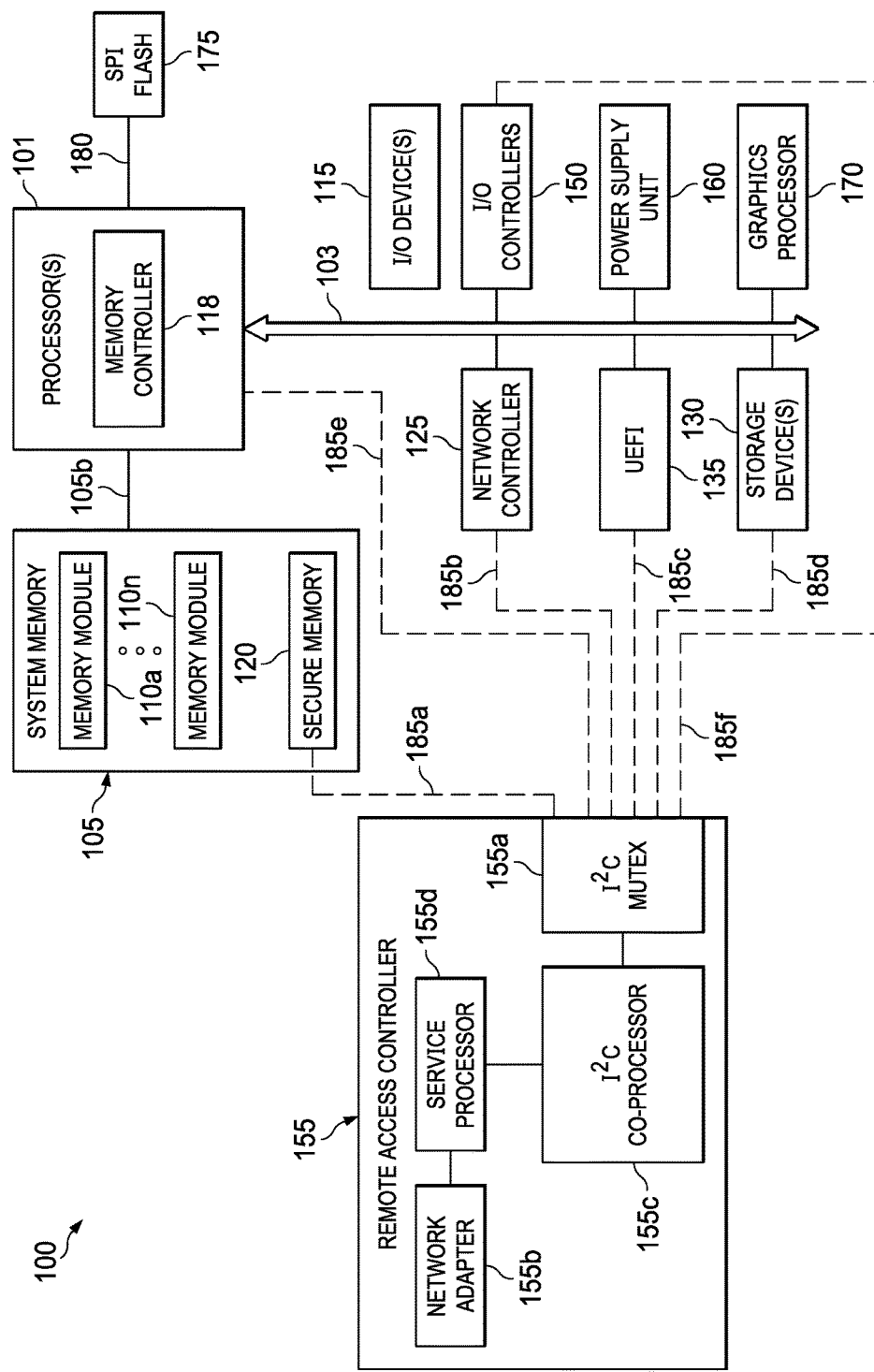
FIG. 1 is a diagram illustrating certain components of an IHS operable, according to some embodiments, to support use of IHS pre-boot resources by workspaces operating on the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting certain components of an illustrative IHS 100 that is operable according to various embodiments for use of IHS 100 pre-boot resources 115 by workspaces operating on the IHS 100. In some embodiments, IHS 100 may be employed to instantiate, manage, and/or terminate a secure workspace that may provide the user of IHS 100 with access to protected data in an isolated software environment in which the protected data is segregated from: the operating system (OS) of the IHS 100, other applications executed by IHS 100, other workspaces operating on IHS 100, and, to a certain extent, the hardware of the IHS. In some embodiments, the construction of a workspace for a particular purpose and for use in a particular context may be orchestrated remotely from the IHS 100 by a workspace orchestration service, such as described with regard to FIG. 2. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 105*b*.

System memory 105 that is coupled to processor(s) 101 via memory bus 105*b* provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In IHS 100, chipset 103 is illustrated as a single coupling with processor 101. However, other implementations may utilize any number of connections to provide the illustrated communication pathways supported by chipset 103. In some instances, capabilities supported by processor 101 are not directly available to workspaces operating on IHS 100 due to the isolation of these workspaces from certain hardware and software of the IHS. This isolation of workspaces from the hardware of IHS 100 extends to a similar inability by workspaces to invoke some or all of the resources of IHS 100 directly, such as pre-boot resources of the IHS 100. Embodiments provide capabilities by which workspaces may be provided managed access to pre-boot resources of the IHS 100.

In certain embodiments, IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100.

As illustrated, processor(s) 101 may also be coupled to a network controller 125, such as provided by a Network Interface Controller (NIC) that is coupled to the IHS 100 and allows the IHS 100 to communicate with other systems, such as other IHSs similarly configured to IHS 100, via an external network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In some embodiments, network controller 125 may be instrumented with a controller or other logic unit that supports a sideband management connection 185*b* with remote access controller 155.

Chipset 103 may also support communications with one or more display device(s) via graphics processor 170. In certain embodiments, graphics processor 170 may be comprised within one or more video or graphics cards or an embedded controller installed as components of the IHS 100. Graphics processor 170 may generate display information and provide the generated information to one or more display device(s) coupled to IHS 100, where display device(s) may include integrated display devices and/or external display devices coupled to IHS, where the display devices may be I/O devices 115 accessed via I/O controllers 150 of the IHS. In certain embodiments, some or all of the functions supported by graphics processor 170 may be integrated within processor 101. The one or more display devices coupled to IHS 100 may utilize LCD, LED, OLED, or other thin film display technologies. Each display device may be capable of touch input such as via a touch controller that may be a component of display device, graphics processor 170, I/O controller 115, or a separate component of IHS 100 accessed via bus 103.

In certain embodiments, chipset 103 may utilize one or more I/O controllers 150 to access various I/O devices 115 that may be removably coupled to the IHS various wired and/or wireless technologies. For instance, I/O controllers 150 may provide access to I/O devices such as a keyboard, mouse, touchpad, touchscreen, stylus and other input devices that may interface with an I/O controller 150 through wired or wireless connections in providing user input capabilities. I/O devices 115 of the IHS 100 may also include sensors that are accessed via I/O controllers 150 and that may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.).

In some embodiments, the data inputs collected by such sensors may be received by a sensor hub capable of utilizing this information in determining various physical characteristics of the location and manner in which IHS 100 is being utilized. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or by a network interface. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing an integrated display. In some embodiments, the sensors of IHS 100 may also include capabilities for facial recognition of a user of the IHS, where these facial recognition capabilities may be used to compare captured images against reference images of in order positively identify the user of the IHS 100 and to determine whether any unrecognized individuals are in proximity to the IHS.

Chipset 103 also provides processor(s) 101 with access to one or more storage devices 130. In various embodiments, a storage device 130 may be integral to the IHS 100, or may be external to the IHS 100. In certain embodiments, storage device 130 may be accessed via a storage controller that may be an integrated component of the storage device. Storage device 130 may be implemented using any memory technology allowing IHS 100 to store and retrieve data. For instance, storage device 130 may be a magnetic hard disk storage drive or a solid-state storage drive. In some embodiments, storage device 130 may be a system of storage devices, such as a cloud drive accessible via network controller 125. In some embodiments, storage device 130 may be instrumented with a controller or other logic unit that supports a sideband management connection 185*d* with remote access controller 155.

IHS 100 also includes a UEFI (Unified Extensible Firmware Interface) 135 capability that may be implemented based on instructions stored in a non-volatile memory partition that are loaded and executed upon powering of the IHS 100. The UEFI 135 provides an abstraction layer that allows an operating system of the IHS 100 to interface with the hardware components of the IHS 100. More specifically, UEFI 135 provides an abstraction layer to the firmware utilized by the various hardware components of IHS 100. In some embodiments, UEFI 135 may be implemented using a dedicated microcontroller or chip coupled to the motherboard of IHS 100. In some embodiments, some or all of UEFI 135 may be implemented as operations of an embedded controller, such remote access controller 155. Upon powering or restarting IHS 100, UEFI 135 may initialize and test various hardware components of the IHS 100. During this pre-boot interval, UEFI 135 may initiate a shell environment used to execute various UEFI applications, some of which may support pre-boot operations. Upon successful validation of these hardware components, in some embodiments, UEFI 135 may also initiate loading and booting an operating system for use by the IHS 100. As illustrated, UEFI 135 may be instrumented with a controller or other logic unit that supports a sideband management connection 185*c* with remote access controller 155. In some embodiments, UEFI 135 may include support for BIOS (Basic Input/Output System) functions that also provide an interface for interoperating with firmware used by hardware components of the IHS.

As described, workspaces may operate in isolation from certain hardware and software of an IHS, which may prevent the workspaces from interfacing directly with UEFI 135. The inability for workspaces to interface with UEFI 135 precludes the workspaces from utilizing settings supported by UEFI 135 that may be configured prior to booting the operating system of the IHS, and that may continue to be configured by the UEFI 135 after the operating system has been booted. For instance, UEFI 135 pre-boot configurations may be made by setting the value of variables maintained by the UEFI 135, where such variables may control various capabilities of the IHS and of devices coupled to the IHS. For example, configuration of pre-boot UEFI variables may be used to initiate power modes supported by the IHS 100 and by devices coupled to the IHS, such as I/O devices 115. Configuration of pre-boot UEFI variables may also be sued to initiate privacy settings, such as privacy settings supported by a display device coupled to the IHS. As described in additional detail below, embodiments provide capabilities by which workspaces may be provided use of such pre-boot configurations supported by UEFI 135 variables, while providing such use in a manner that maintains the isolation of workspaces from each other and from the hardware of the IHS.

As illustrated, IHS 100 may also include a power supply unit 160 that provides the hardware components of IHS 100 with appropriate levels of DC power. Power inputs received via a power port or via USB ports may be routed to the power supply unit 160 of IHS 100. The power inputs received by power supply unit 160 may be used in powering the operations of IHS 100 and in recharging internal batteries of IHS 100. In some embodiments, power supply unit 160 may support power outputs drawn from the internal batteries of IHS 100 and provided to external devices coupled to IHS 100, such as USB devices coupled to USB ports of IHS 100. In some embodiments, power supply unit 160 may provide power to components of IHS 100 using multiple independent power planes. For instance, as described below, remote access controller 155 may be powered from a separate power plane from processor 101.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 155 may operate from a different power plane from processors 101, storage devices 130, network controller 125 and various other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 101, 120, 125, 130, 135, 150 of an IHS via a sideband bus interface. For instance, messages utilized in device management may be transmitted using I2C sideband bus connections 185*a-f* that may be individually established with each of the respective managed devices 101, 120, 125, 130, 135, 150 through the operation of an I2C multiplexer 155*a* of the remote access controller. As illustrated, managed devices 115, 125, 130, 135, 150 of IHS 100 are coupled to the IHS processor(s) 101 via one or more in-band buses supported by chipset 103, where these in-band busses are separate from the I2C sideband bus connections 185*a-f* used for device management. Accordingly, managed devices 125, 130, 135, 150 communicate with the operating system of IHS 100 via in-band buses supported by chipset 103, while the sideband buses 185*a-f* are used by these managed devices exclusively for communications with remote access controller 155.

In certain embodiments, a service processor 155*d* of remote access controller 155 may rely on an I2C co-processor 155*c* to implement sideband I2C communications between the remote access controller 155 and managed components 101, 120, 125, 130, 135, 150 of the IHS. The I2C co-processor 155*c* may be a specialized co-processor or micro-controller that is configured to interface via a sideband I2C bus interface with the managed hardware components 101, 120, 125, 130, 135, 150 of IHS. In some embodiments, the I2C co-processor 155*c* may be an integrated component of the service processor 155*d*, such as a peripheral system-on-chip feature that may be provided by the service processor 155*d*. Each I2C bus 185*a-f* is illustrated as single line in FIG. 1. However, each I2C bus 185*a-f* may be comprised of a clock line and data line that couple the remote access controller 155 to I2C endpoints 101, 120, 125, 130, 135, 150 on each of the managed components.

As illustrated, the I2C co-processor 155*c* may interface with the individual managed devices 101, 120, 125, 130, 135, 150 via individual sideband I2C buses 185*a-f* selected through the operation of an I2C multiplexer 155*a*. Via switching operations by the I2C multiplexer 155*a*, a sideband bus connection 185*a-f* may be established through a direct coupling between the I2C co-processor 155*c* and each of the individual managed devices 101, 120, 125, 130, 135, 150. In providing sideband management capabilities, the I2C co-processor 155*c* may interoperate with corresponding endpoint I2C controllers that implement the I2C communications of the respective managed devices 101, 120, 125, 130, 135, 150. The endpoint I2C controllers may be implemented as dedicated microcontrollers for communicating sideband I2C messages with the remote access controller 155, or endpoint I2C controllers may be integrated SoC functions of a processor of the respective managed device endpoints 101, 120, 125, 130, 135, 150.

In some embodiments, remote access controller 155 may perform various operations in support of the delivery and deployment of workspaces to IHS 100. In certain embodiments, remote access controller 155 may interoperate with a remote orchestration service via the described out-of-band communications pathways that are isolated from the operating system that runs on IHS 100. In some embodiments, a network adapter 155*b* that is distinct from network controller 125 utilized by the operating system of IHS 100 may support such out-of-band communications between remote access controller 155 and a remote orchestration service. Via this out-of-band signaling pathway, remote access controller 155 may receive authorization information that may be used for secure delivery and deployment of a workspace to IHS 100 and to support secure communication channels between deployed workspaces and various capabilities supported by IHS 100, while still maintaining isolation of the workspaces from the hardware and operating system of IHs 100.

In some embodiments, remote access controller 155 may utilize sideband signaling pathway 185*f* in determining the pre-boot variable configurations of UEFI 135 that may be available to workspaces according to the embodiments described herein. As described in additional detail below, various embodiments may utilize one or more Isolated Pre-boot Spaces (IPSs) that provide workspaces with access to certain pre-boot operations, but do so in isolation from other workspaces, thus preserving the security context of the workspace. In some embodiments, the pre-boot capabilities of the UEFI 135 that are available to workspaces may be determined by the remote access controller 155, such as via the sideband signaling pathway 185*f*. In some embodiments, certain pre-boot capabilities that are available to workspaces may be implemented by the remote access controller 155.

In some embodiments, authorization and cryptographic information received by remote access controller 155 from a remote orchestration service may be stored to secured memory 120. As illustrated in FIG. 1, in some embodiments, remote access controller 155 may access secured memory 120 may via an I2C sideband signaling pathway 185*a* between I2C multiplexer 155*a* and an I2C communication capability supported by secure memory 120. Remote access controller 155 may support execution of a trusted operating environment that supports secure operations that are used to deploy a workspace on IHS 100. In certain embodiments, remote access controller 155 may calculate signatures that uniquely identify various hardware and software components of IHS 100. For instance, remote access controller 155 may calculate hash values based on instructions and other information used to configure and operate hardware and/or software components of IHS 100. For instance, remote access controller 155 may calculate a hash value based on firmware and on other instructions or settings of a component of a hardware component. In some embodiments, hash values may be calculated in this manner as part of a trusted manufacturing process of IHS 100 and may be stored in the secure storage 120 as reference signatures used to validate the integrity of these components at a later time. In certain embodiments, a remote orchestration service supporting the deployment of workspaces to IHS 100 may verify the integrity of the remote access controller 155 in a similar manner, by calculating a signature of remote access controller 155 and comparing it to a reference signature calculated during a trusted process for manufacture of IHS 100.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
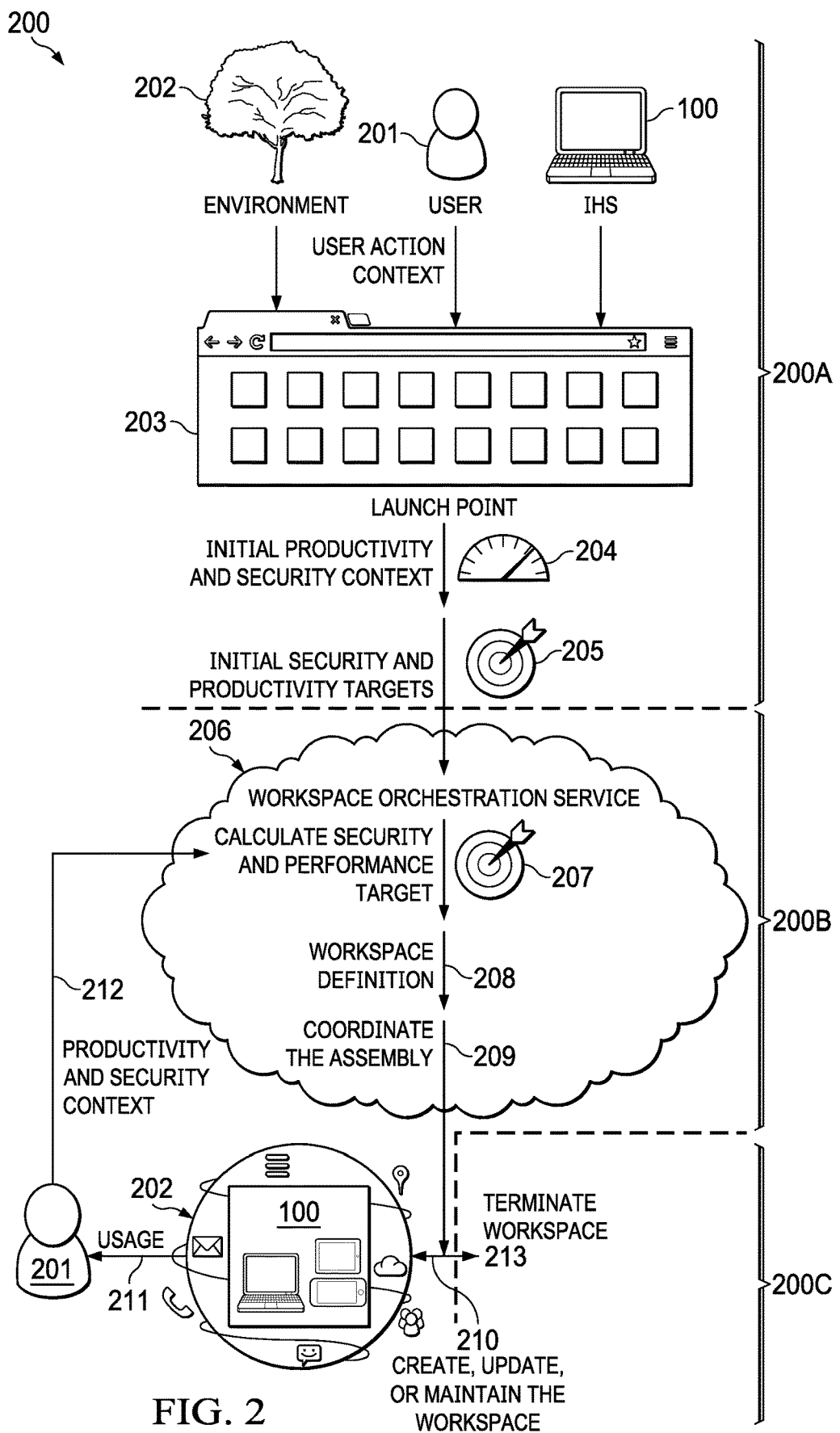
FIG. 2 is a diagram depicting illustrative embodiments of methods and system for deployment and management of workspaces on an IHS in a manner that supports use of IHS pre-boot resources by workspaces operating on the IHS.

FIG. 2 is a diagram depicting illustrative embodiments of methods and system for deployment and management of workspaces on an IHS in a manner supporting use of IHS pre-boot resources by workspaces operating on the IHS. For sake of explanation, the workspace lifecycle supported by embodiments has been split into three phases: workspace initialization phase 200A, workspace orchestration phase 200B, and workspace termination phase 200O. During initialization 200A, user 201 operates an IHS 100, such as described with regard to FIG. 1, within a physical environment 202 (e.g., any type of environment and its associated context, including physical location, geographic location, location within a particular facility or building, detected networks, time of day, proximity of the user, individuals in the vicinity of IHS 100, etc.).

The illustrated method for the workspace lifecycle according to embodiments may be initiated with an action by user 201 at a user interface that serves as a launch point 203 for initiating a workspace. In various instances, launch point 203 may be a corporate launch point provided by an employer of user 201, a manufacturer launch point provided by the manufacturer of IHS 100, or a third-party launch point provided as a service to user 201 by a third-party. In various instances, user 201 may operate IHS 100 to access a launch point 203 that is provided in the form of a web portal, a portal application running in the operating system of IHS 100, or a special-purpose portal workspace operating on IHS 100. In various embodiments, launch point 203 may be implemented using graphical, textual and/or audio interfaces by which data or other resource may be requested by a user 201. In various implementations, launch point 203 may include Graphical User Interface (GUI) elements, such as icons, that represent different software applications, data sources and/or other resources that the user may select for use via a workspace. As such, launch point 203 may provide a user with an ability to request initiation of a workspace that process access to software applications and data sources that are available to the user 201.

As described in additional detail below, workspaces for providing user 201 with access to protected data or other resources may operate using a local management agent 332 that operates on IHS 100 and is configured to interoperate with workspace orchestration service 206. As described, launch point 203 may be provided in the form of a portal (e.g., a webpage, OS application or special purpose workspace) that includes a user interface that allows user 201 to request access to managed resources. In some embodiments, launch point 203 may be hosted by the local management agent 332 that runs on IHS 100 and interoperates with remote workspace orchestration service 206. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source that is managed by the workspace orchestration service 206. In response to an access request issued by user 201 (e.g., the user "clicks" on an icon presented by launch point 203), at 204, local management agent 332 of IHS 100 collects initial security context information and productivity context information. In various embodiments, the security context information of a workspace may include attributes indicating a security risk associated with: the data and/or application being requested, a level of risk presented by the user 201, the hardware of the IHS 100, the logical software environment of IHS 100 in which a workspace will be deployed, and the physical environment 202 in which IHS 100 is currently located. Accordingly, in this disclosure, a "security context" generally refers to data or other information related to a security posture in which a workspace will be deployed and utilized, where the security posture may be based on characteristics of user 201, IHS 100, the data and/or application to be accessed via the workspace, and/or environment 202. In some embodiments, a security context may be quantified as a security risk score in support of evaluations of the level or risk associated with providing user 201 access to requested data and/or application while using IHS 100 in the particular context.

In various embodiments, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the operating system and other applications in use on IHS 100, availability of encryption, type of available encryption, access to secured storage, use of attestable hardware by IHS 100, and supported degree of workspace isolation by IHS 100.

In this disclosure, "productivity context" generally refers to user 201 productivity associated with a workspace, user 201, IHS 100, and/or environment 202. A "productivity score" generally refers to an index usable to score, quantify, or measure various productivity characteristics of a productivity context. Examples of productivity context information may include, but are not limited to: the hardware of the IHS 100 that is available for use in support of a workspace, the software of the IHS 100 that is available for use in support of the workspace, power states of IHS 100 and/or hardware components of IHS 100, maximum clock frequencies of hardware components of IHS 100 that can currently be supported, maximum operating speeds of software components of IHS 100, peripheral devices coupled to IHS 100 and networks available for use by IHS 100 in supporting the workspace.

Initial productivity and security targets for a workspace may be calculated, at 205, based on the context of user's 201 actions combined with the productivity and security context in which the workspace will operate. In some cases, at 205, a local management agent 332 operating on IHS 100 may calculate initial security and productivity targets based upon the collected security and productivity context. In other cases, remote workspace orchestration service 206 may calculate security and productivity targets for a workspace. In this disclosure, "security target" generally refers to the attack surface presented by a workspace that is created and operated based on a specific workspace definition, while "productivity target" generally refers to the productivity characteristics of a specific workspace definition. Examples of a productivity target characteristics include, but are not limited to: types of data or data sources available to user 201 within a workspace, latency of the workspace, software applications available within the workspace, responsiveness of the workspace and remaining computational overhead available to the workspace. Attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces and the ability to extend a workspace. In some instances, productivity and security targets may also be based on user's 201 behavioral analytics, IHS 100 telemetry and/or environmental information that is collected via sensors of IHS 100.

In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of the security context (e.g., location, patch level, threat information, network connectivity, etc.) and the productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 that is configured for operation with the workspace orchestration service 206.

In specifying capabilities and constraints of a workspace, a workspace definition 208 may prescribe one or more of: authentication requirements for user 201, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), and workspace capabilities available to independently attach other resources.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during an orchestration phase 200B of workspace deployment, at 208, the initial security and productivity targets are processed and/or reconciled against resources, IHS capabilities, and cloud services capabilities in order to produce a workspace definition. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace, applications to be provided for operation within the workspace, aggregation of resources available via the workspace, configurations for accessing data or resources (e.g., required use of a virtual private network (VPN)).

As described in additional detail with regard to FIG. 3, the initial workspace definition may then be utilized by an automation engine 302 of workspace orchestration service 206 to coordinate the assembly 209 and instantiation 210 of a workspace on an appropriate platform (e.g., on the cloud, on IHS 201, or some combination of the two) based on the security and productivity contexts in which the workspace will operate. In some embodiments, automation engine 302 may resolve configuration conflicts between a workspace definition and the user's inputs in the operation of a workspace. In cases where a workspace is cloud-hosted, the automation engine 302 may assemble and instantiate a remote workspace that may be accessed via a secure connection established via a web browser or other web-based component operating on the IHS 100.

At 211 of FIG. 2, the instantiated workspace is operated by user 201 and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation, at 207, of the security and performance targets by automation engine 302. Additionally or alternatively, new workspace context, security target, and/or productivity target may be now measured against the initial targets, and the result may cause automation engine 302 to produce a new workspace definition at 208.

Particularly, if the instantiated workspace(s) have security or productivity parameters that fall outside of a range of the target scores for these parameters such that a difference between an updated context information and the previous context information is scored below a threshold value, automation engine 302 may generate modifications to an existing workspace and, at 210, may deploy an updated workspace according to the modified definition. Conversely, if the difference between an updated context information and the previous context information is scored above a threshold value, automation engine 302 may generate a new workspace at 210. Session data metadata and context may be preserved by data aggregation engine 336, and session data may be restored in the new workspace as applicable.

Various conditions may trigger termination of a workspace at 213, as part of termination phase 2000. In some cases, user action may initiate the termination of a workspace (e.g., user 201 closes application or browser accessing data). In other cases, termination of a workspace may take place automatically as part of an adjustment in workspace definition (e.g., the workspace is terminated by automation engine 302 in order to support a new or updated workspace). As part of a termination phase 2000 of a workspace, various workspace resources of IHS 100 and/or at workspace orchestration service 206 may be released.

Figure 3A:
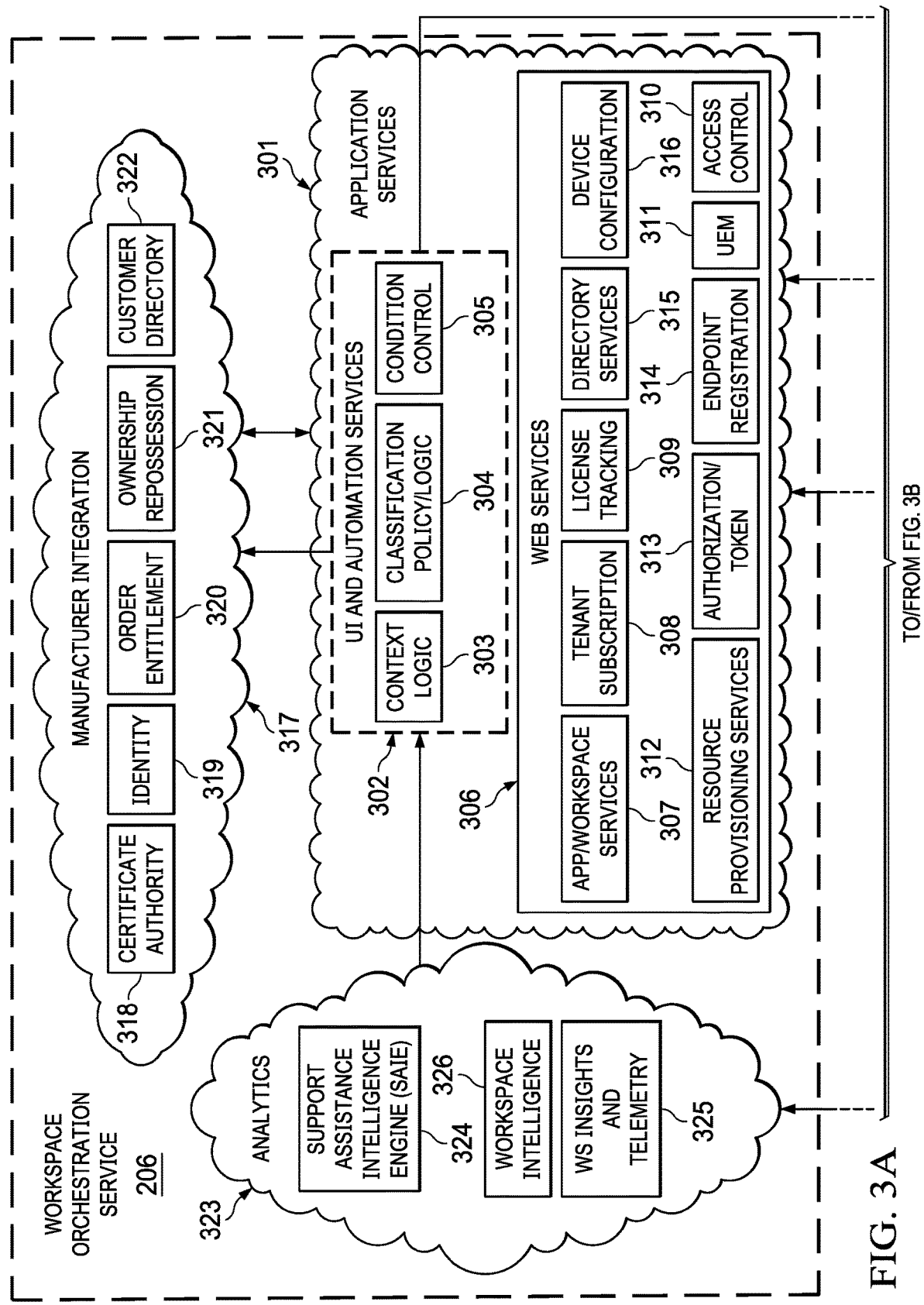
FIGS. 3A and 3B are a diagram depicting an illustrative system configured according to embodiments for deployment and management of workspaces on an IHS in a manner that supports use of IHS pre-boot resources by workspaces operating on the IHS.
Figure 3B:
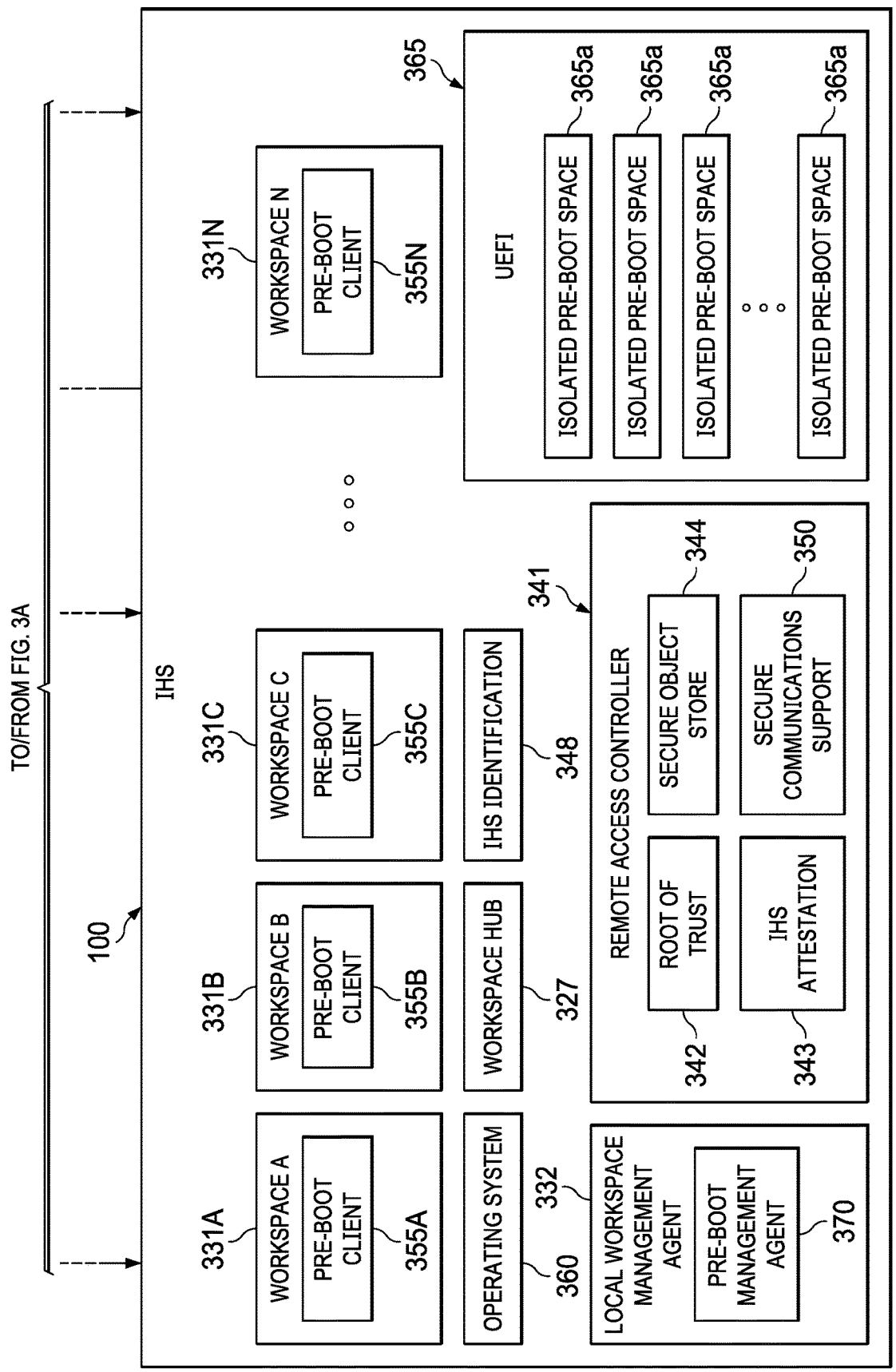

FIGS. 3A and 3B are diagrams depicting illustrative embodiments of a system for deployment and management of workspaces on an IHS 100 in a manner that supports use of IHS 100 pre-boot resources by workspaces operating on the IHS 100. The illustrated system includes a workspace orchestration service 206 that performs various workspace orchestration operations described above, such as: the evaluation of security and productivity targets based upon context information, the calculation of risk scores and other productivity and security metrics based on ongoing collection of context information, the generation of workspace definitions, and the assembly and instantiation of workspaces in accordance with a workspace definition, where the workspaces may be instantiated via a cloud service or an IHS 100, such as described with regard to FIG. 1 and further described with regard to FIG. 3B. As described, IHS 100 may supported deployment and operation of workspaces through the collection of productivity and security context information, the calculation of productivity scores and/or risk scores, the instantiation, execution, and modification of a workspace based upon workspace definitions that are received from workspace orchestration service 206.

Workspace orchestration service 206 and IHS 100 may be coupled to each other via any suitable network technology and/or protocol which allows workspace orchestration service 206 to interoperate with IHS 100. As described with regard to FIG. 1, an IHS 100 according to embodiments may include a component such as a remote access controller 155 that may support secure out-of-band communications that are independent from the operating system of IHS 100. In some embodiments, such a remote access controller may be configured to utilize such out-of-band communication capabilities to support deployment and operation of workspaces on IHS 100 and to report changes in context information to the workspace orchestration service 206.

As illustrated in FIG. 3A, workspace orchestration service 206 may include a number of sub-components that support deployment and ongoing evaluation and adaptation of workspaces on an IHS 100. Embodiments of the workspace orchestration service 206 may include systems that may support web services 306, manufacturer integration 317, and analytics 323. As illustrated, web services 306 may, in turn, comprise application services 301 and user interface (UI) and automation services 302. In some embodiments, analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, performance measurements, use of features, settings, etc.) resulting from the operation of workspaces. Workspace intelligence 326 may include an intelligence engine for processing and evaluating context data in order to identify patterns and tendencies in the operation of workspaces and in the adaptation of workspaces based on context changes.

As illustrated, an application services 306 system of the workspace orchestration service 206 may include a UI and automation services 302 system that may include context logic engine 303, classification policy logic 304, and condition control engine 305. Context logic engine 303 may support processing of context information in making risk assessments (e.g., evaluating the risk associated with requests by the user against the context of the user's behavior, history of the use of IHS 100, capabilities of IHS 100, and environmental conditions). For instance, security context information collected by IHS 100 may be provided to workspace orchestration service 206 where it may be used by context logic 303 to calculate a risk score associated with a request for use of a managed data source and/or application. Classification policy 304 may include administrator and machine-learning defined policies describing risk classifications associated with different security contexts, such as risk classifications associated with specific data, locations, physical environments, IHSs, logical environments, and user actions (e.g., use of high-risk data requires use of a workspace definition suitable for use with a risk score above a specific value). Condition control engine 305 may include intelligence providing automated decision making for alignment of risk and context. In some cases, condition control engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score.

Application services 301 may include a group of web services 306 called on by UI and automation services 302 to support various aspects of the orchestration of workspaces. Particularly, web services 306 may include application and workspace services 307 that may assemble and package applications for deployment in a workspace (e.g., an ".msix" file packaged and deployed to a MICROSOFT HYPER-V container). In some embodiments, a workspace definition may be used to specify various such types of workspace deployments that will be used to provide a user with access to an application. Web services 306 may also include a tenant subscription module 308, that performs dynamic configuration of an IHS 100 for use with the described workspace orchestration services 206 at the point-of-sale (POS) of the IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces deployed on IHS 100 may further include resource provisioning services 312 for configuring IHS 100 or a workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned to IHS 100, such as to secure memory 120, as part of a trusted assembly process of IHS 100 and, in some instances, associated with a unique identifier 348 of the IHS 100. Web services 306 may also include an authorization/token module 313 that provides identity functions and may connect to various authentication sources, such as Active Directory. Endpoint registration module 314 may be configured to register IHSs and/or workspaces in order to track the use of the described workspace orchestration. In some scenarios, a directory services 315 module may be configured to provide active directory services (e.g., AZURE ACTIVE DIRECTORY from MICROSOFT CORPORATION). Device configuration services 316 may enable central configuration, monitoring, managing, and optimization of workspaces that in certain contexts may operate remotely from an IHS and may only present the user of the IHS with a user interface that presents an image of the workspace output. In cooperation with resource provisioning services 312, device configuration services 316 may also handle creation of secrets and IHS configuration.

Still referring to FIG. 3A, manufacturer integration components 317 communicate with application services 301 and client IHS 100 to provide features that are usable during workspace evaluation and instantiation, where these features may be based upon information available to the manufacturer of IHS 100. For instance, certificate authority 318 may include an entity that issues digital certificates that may be used in validating the authenticity and integrity of the hardware of IHS 100. Identity service module or engine 319 may be configured to manage the user identities, as well as brokering user identification for use of customer directory 322. Order entitlement engine 320 may be used to manage purchased entitlements as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 100 of FIG. 3B, in some embodiments, IHS 100 may be configured to operate a local workspace management agent 332 that may operate as a trusted and attestable process of IHS 100 and that may operate independent from the operating system 360 of IHS 100. In some embodiments, local workspace management agent 332 may include a workspace engine that instantiates and manages the operation of one or more workspaces 331A-N on IHS 100. As described, the capabilities of a workspace 331A-N may be modified based on detected changes in the productivity and security contexts in which the workspace is operating. Accordingly, the workload(s) in each of the workspaces 331A-N may be hosted in full or in part by a cloud resource, a specific server, or locally hosted on IHS 100, depending on the context in which the workspace is operating. These allocations of workspace computing for each particular workspace 331A-N may be prescribed by the workspace definition that is used to build and operate each workspace. As described, the workspace definition may be created by workspace orchestration service 206 based upon: context information provided by IHS 100, security targets for each workspace 331A-N, and/or productivity targets for each workspace 331A-N.

In some embodiments, local management agent 332 may be configured to host, launch, and/or execute a workspace hub 327 that provides a launch point 203 by which users may initiate workspaces 331A-N through the selection of managed data and/or resources. As described, launch point 203 may be an agent, application, special-purpose workspace or web portal the provides a user interface by which a user may select from a collection of data sources, applications, peripheral devices, or other managed information or resources that are available to the user of IHS 100 via the operation of a workspace as described herein. In various embodiments, launch point 203 may be provided in the form for textual, graphical and/or audio user interfaces that allow a user of IHS 100 to select available data and/or resources. Workspace hub 327 may utilize a local environment management module in providing the workspace interface that is presented to the user on IHS 100 in a consistent manner across workspaces 331A-N.

In some embodiments, each instantiated workspace 331A-N may be a logical software environment that provides a user with access to requested data or applications, where the environment may be isolated in varying degrees from the hardware and software of IHS 100 based on the security context and productivity context in which each workspace 331A-N is operating. In some instances, the selection of a data source or resource that is available to user via launch point 203 may result in launching a new workspace 331A-N. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user selects a confidential presentation file available from a data source that is provided by launch point 203, an additional workspace 331A-N may be instantiated with use of a presentation application and with access to the requested presentation file, where this new workspace is created based on a workspace definition that provides appropriate security for access to the confidential presentation. In other instances, a selection of the presentation file by a user may result in the presentation being made available through the existing workspace, in some cases using the existing workspace definition and, in other cases, using a workspace definition that has been modified to support the requested access to the confidential presentation file.

In various embodiments, in order to execute the various operations described herein, local management agent 332 may include a command monitor that provides instrumentation to receive commands from workspace orchestration service 206 in support of adaptation of workspaces 331A-N based on detected changes in context. Local management agent 332 may include a telemetry module that may collect and communicate information to the workspace orchestration service 206, including reporting changes in context that may warrant adjustments to workspaces 331A-N. Local management agent 332 may also utilize a resource manager module that is configured to manage access to data, network configuration, such as for VPNs and network access, identity information, access control, and resource provisioning services. A security module of local management agent 332 may be configured to provide various security services. IHS 100 may include an IHS identification module 348 that provides a unique, unspoofable identifier that is cryptographically bound to IHS 100.

As described in additional detail below, an individual workspace 331A-N may be provided with use of pre-boot resources of IHS 100, such as capabilities of a UEFI 365 of the IHS. Utilizing the provided embodiments, such use of pre-boot resources by workspaces 331A-N may be provided in a manner that maintains workspace isolation. As described above, a UEFI 365 may provide an interface to firmware of an IHS, where such interface is in operation prior to booting the operation system 360 of an IHS, and where such interface remains available separate from the booted operating system 360 of the IHS. For example, UEFI 365 may support configuration of power settings, privacy capabilities and hardware controls that are supported by an IHS 100. Embodiments provide capabilities by which workspaces 331A-N may access such capabilities supported by UEFI 365, while maintaining isolation of these workspaces.

As illustrated in FIG. 3B, UEFI 365 may support multiple isolated pre-boot spaces (IPSs) 365a-n. In some embodiments, UEFI 365 may include a shell or other operating environment in which software applications operating in support of UEFI 365 may be run. Within such an environment utilized by UEFI 365, embodiments may implement multiple isolated pre-boot spaces 365A-N that are each dedicated for use by a particular workspace 331A-N, or for use by a particular group of workspaces. In some embodiments, each of the isolated pre-boot spaces 365A-N may operate using a segregated partition within an NVRAM or other memory used by the UEFI 365. In existing UEFI systems, the status of system variables that may be configured via UEFI is information that is available to all applications that can access the UEFI subsystem. As described in additional detail below, embodiments provide capabilities by which each workspace 331A-N is provide use of an isolated pre-boot space 365A-N in which only UEFI variables that have been approved for configuration by that particular workspace are populated within the pre-boot space. Each workspace 331A-N has access only to the UEFI variables populated in its assigned isolated pre-boot space 365A-N such that workspace have no visibility into UEFI variables approved for use by other workspaces or UEFI configurations that are initiated by other workspaces.

In some embodiments, each workspace 331A-N may include a pre-boot client 355A-N that may be used to manage the configuration of available pre-boot resources of the IHS on behalf of a respective workspace. As described in additional detail below, a pre-boot client 355A-N may be configured based on identification of pre-boot resources of the IHS 100 that have been registered with the workspace orchestration service 206 as being available to some or all of the workspaces 331A-N. In some instances, such pre-boot resources of IHS 100 that are available for use by workspaces 331A-N may be identified for workspace orchestration service 206 by remote access controller 341 via out-of-band signaling pathways that are independent from operating system 360 of IHS 100, such as described with regard to FIG. 1.

As illustrated in FIG. 3B, IHS 100 includes a remote access controller 341 that provides capabilities for remote management of IHS 100 and that provides out-of-band management of various hardware components of IHS 100. As indicated in FIG. 3B, the remote access controller 341 operates independently from the operating system 360 in providing remote management of IHS 100. A selected portion of the capabilities of a remote access controller 341 are illustrated in FIG. 3B. As described with regard to FIG. 1, a remote access controller 341 may include a root of trust 342 capability that is used to evaluate firmware instructions to be used by various hardware components of IHS 100 against reference signatures for these components, thus validating the firmware in use by these components. In some embodiments, workspace operations supported by workspace orchestration service 206 may require such root of trust validations by remote access controller 341 prior to initiating deployment of workspaces to IHS 100. In some embodiments, remote access controller 341 may include a secure object store 344 for use in storing reference signatures used by root of trust 342 module. As described with regard to FIG. 1, reference signatures utilized by root of trust 342 module may alternatively or additionally be stored in a secure memory of IHS 100. In some embodiments, an IHS attestation 343 module of remote access controller 341 may interface with workspace orchestration service 205 in providing confirmations of root of trust validations of the hardware components of IHS 100.

Figure 4:
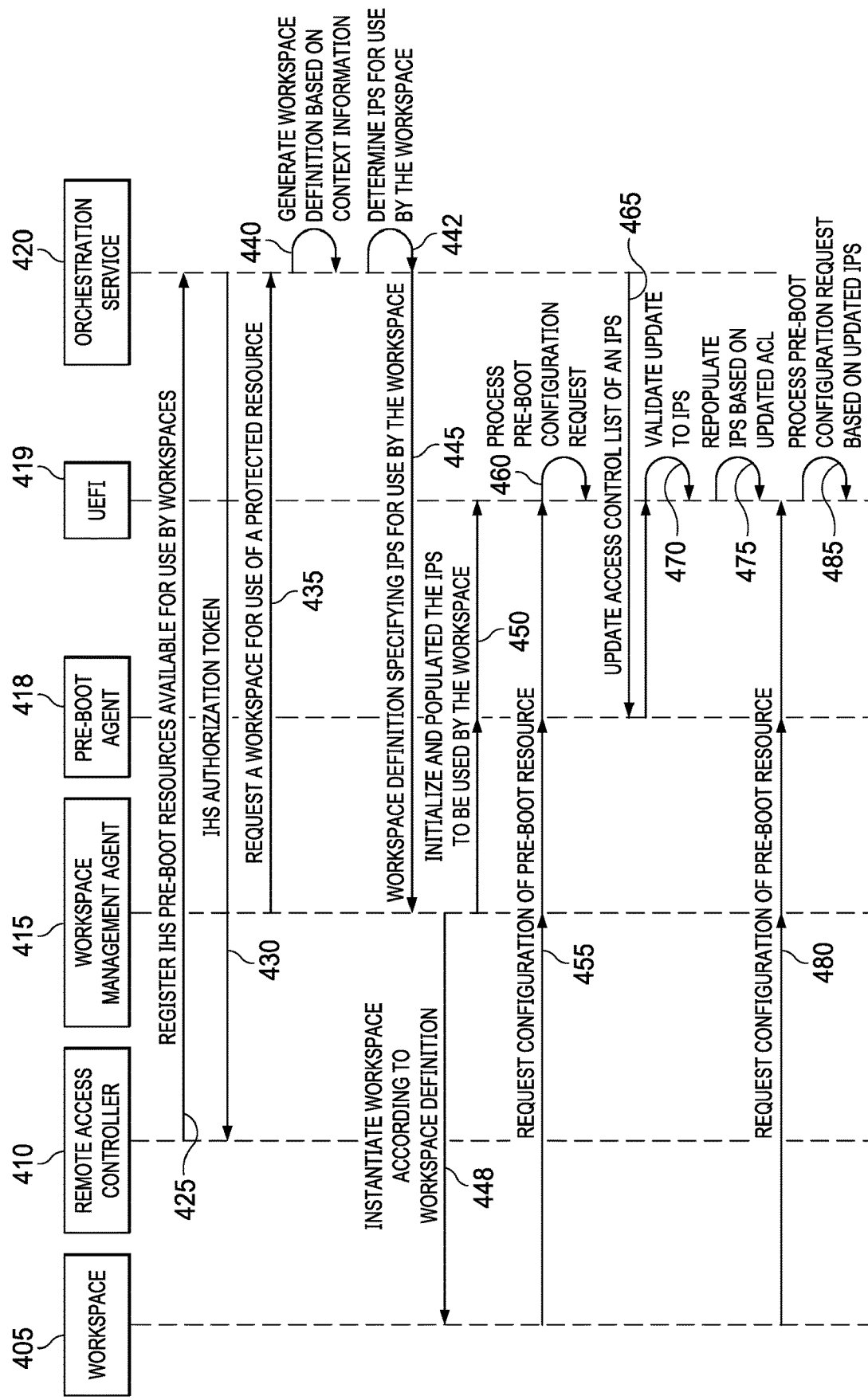
FIG. 4 is a swim lane diagram describing the operation of certain components of a system according to some embodiments, providing use of IHS pre-boot resources by workspaces operating on the IHS.

FIG. 4 is a swim lane diagram describing the operation of certain components of a system, according to some embodiments, that provides use of IHS pre-boot resources by workspaces operating on the IHS. Embodiments may begin with the initialization of an IHS that is configured according to the embodiments described above. As described, in some embodiments, initialization procedures of an IHS may include validation of instructions utilized by various hardware components of the IHS. For instance, firmware instructions to be loaded by a remote access controller 410 of the IHS may be used to generate a hash value that is compared to a digital signature stored in a secure memory of the IHS, where the digital signature corresponds to authentic firmware instructions stored for use by the remote access controller during a trusted manufacturing process of the IHS, or during another trusted administrative process. In this same manner, the firmware instructions utilized by various hardware components of the IHS may be successively validated against stored reference signatures in order to iteratively expand a root of trusted hardware components of the IHS. In some embodiments, the firmware instructions of the remote access controller 410 that are validated in this manner may include instructions used by the remote access controller to determine pre-boot resources of the IHS that may be utilized by workspaces operating on the IHS and to transmit such local pre-boot resource information to a remote workspace orchestration service 420.

As indicated in FIG. 4, once the instructions utilized by the remote access controller 410 have been validated, the remote access controller may utilize these instructions, at 425, to communicate with a remote workspace orchestration service 420 in registering for secure use of IHS pre-boot resources by workspaces operating on the IHS. In some embodiments, the validated firmware instructions utilized by the remote access controller 410 may include instructions for identifying pre-boot resources of the IHS that may be used by workspaces operating on the IHS and instructions for transmitting a registration of these available IHS pre-boot resources. Using such validated instructions, the remote access controller 410 may provide the workspace orchestration service 420 with a listing of IHS pre-boot resources that are available for use by workspaces 405 operating on the IHS. For example, such a list of available IHS pre-boot resources may specify UEFI 419 variables that are available for configuration by workspaces 405 operating on the IHS.

At 430 of FIG. 4, in response to receiving a list of available IHS pre-boot resources, the workspace orchestration service 420 transmits an authorization token to the remote access controller 410. This authorization token may be used to establish secure communications between a workspace management agent 415 of the IHS and the remove orchestration service 420 in providing the workspace with access to the available pre-boot resources of the IHS. In some embodiments, the authorization token provided to the remote access controller 410 may be calculated based on a unique identifier of the IHS, such as an identifier provided by an IHS identification 348 function of IHS, where this unique identifier may be a service tag or other unique code assigned to the IHS upon its manufacture. By generating the authorization token based on a unique identifier of IHS, the token is thus bound to that particular IHS such that any attempts to utilize the token by other IHSs are detectable.

The identification of available pre-boot resources by the remote access controller 410 and the receipt of an authorization token from the workspace orchestration service 420, may be completed upon initialization of the remote access controller 410 and prior to booting an operation system of the IHS, and thus prior to the user commencing actual use of the IHS. Once the IHS has been initialized and is in use, a workspace may be initialized or reinitialized. In some instances, a workspace may be initialized in response to a user requesting access to a protected resource via a workspace launch point operating on the IHS, such as described with regard to FIG. 2. As described with regard to FIGS. 3A and 3B, an IHS supporting the use of workspaces may operate using a workspace management agent, represented as 415 in FIG. 4, that is used to deploy and manage workspaces operating on the IHS.

In response to a user initiating a request for use of a protected resource through operation of a workspace, at 435, the workspace management agent 415 transmits a request for a workspace for use of the protected resource to the workspace orchestration service 420. At 440, the workspace orchestration service 420 generates a workspace definition for generating and operating a workspace that provides the user with access to the protected resource. As described above, a workspace definition may be selected based on factors such as the security context and productivity context of the IHS that will host the workspace, the user making the request and/or the logical and physical environment in which the workspace will operate. Various types of context information may be provided to the workspace orchestration service 420 as part of the request from the workspace management agent 415. Additional context information may be collected by the workspace orchestration service 420 from the remote access controller 410.

One aspect of configuring a workspace in response to such a request includes determining an isolated pre-boot space for use by the workspace. As described, embodiments may provide workspaces with use of pre-boot resources through an isolated pre-boot space (IPS) that segregates each workspace's use of pre-boot resources in a manner that maintains each workspaces' isolation from other workspaces. Is illustrated in FIG. 4, at 442, the workspace orchestration service 420 may determine an isolated pre-boot space that will be mapped for use by a workspace 405. In some embodiments, each workspace that is instantiated may be mapped to a new isolated pre-boot space, where each isolated pre-boot space may be reserved for exclusive use of that workspace. In such instances, the workspace orchestration service 420 generates a mapping of workspace 405 to a new isolated pre-boot space that will be implemented by the UEFI 419 of the IHS. In some embodiments, a mapping of an isolated pre-boot space to a workspace 405 may be generated based on the type of workspace 405 that is being initiated. For instance, workspaces 405 may be initiated from baseline workspace shells that are provisioned in an IHS for use in launching workspace in particular contexts, such as at certain locations or when coupled to a particular docking station. In such instances, the isolated pre-boot space for use by workspace 405 may be selected based on a baseline shell from which the workspace was generated.

In some embodiments, multiple different workspaces may utilize a shared isolated pre-boot space. In such instances, upon a workspace definition being generated for a new workspace 405, the workspace orchestration service 420 may evaluate the workspace definition against the workspace definitions corresponding to other workspaces that are currently operating on the IHS. If the security constraints of the new workspace do not prohibit sharing of an isolated pre-boot space with other workspaces with similar security profiles, the workspace orchestration service 420 may map the new workspace 405 to use of an existing isolated pre-boot space that is already in use by UEFI 419 in support of other workspaces with similar workspace definitions. For instance, a workspace 405 generated for use in accessing public web sites may have a workspace definition that is similar to the workspace definition of a workspace on the same IHS that was generated for streaming public audio and/or video data. Based on such similarities, these two workspaces may thus share use of the same isolated pre-boot space by virtue of neither of the two workspaces being used to access protected data. In some embodiments, mappings from workspaces to an isolated pre-boot space may be determined based on assignments by an administrator that classify types of workspaces, such as based on a security score for the workspace 405, to isolated pre-boot space assignments.

Based on evaluation of the context information, at 445, the workspace orchestration service 420 transmits the workspace definition and other data for generating a workspace to the workspace management agent 415. In addition to specifying an IPS for use by the requested workspace, the data included in a workspace definition may specify various libraries, executables and other files that may be validated against a reference signature in order to ensure the workspace 405 is operating using only trusted instructions. Using the received workspace definition, at 448, the workspace management agent 415 instantiates and deploys the workspace 405 that will provide the user with access to the requested resource. In addition, based on the isolated pre-boot space information included in the workspace definition, the workspace 405 may be configured for use of the isolated pre-boot space that has been mapped for use by this workspace 405 by the remote orchestration service 420. As described with regard to FIG. 3B, a workspace may include a pre-boot client 355A-N that manages access to pre-boot resources of an IHS by a particular workspace. In such embodiments, the pre-boot client of a workspace 405 may be initialized and configured to issue requests to access pre-boot resources of the IHS to a particular isolated pre-boot space, where the isolated pre-boot space may be specified using a unique identifier that is provided by the workspace orchestration service 420 and that may be included in the workspace definition for the workspace 405.

As described above, workspace 405 may be instantiated by a workspace management agent 415 that operates on IHS. In some embodiments, the workspace management agent 415 may receive a workspace definition from the workspace orchestration service 420a may use this workspace definition in instantiating and supporting a workspace 405. In some embodiments, the workspace management agent 415 may also utilize the isolated pre-boot space mapping information that is included in the workspace definition, at 450, to request initialization of the isolated pre-boot space that has been mapped for use by this workspace 405. In some embodiments, the workspace management agent 415 may issue a request to the UEFI 419 for configuration of an isolated pre-boot space for use only by workspace 405. In some embodiments, the isolated pre-boot space to be created by UEFI 419 may be identified by the described unique identifier provided by the workspace orchestration service 420. The workspace 405 that is mapped to this particular isolated pre-boot space may also be identified by a unique identifier provided by the workspace orchestration service 420. In response to a request from the workspace management agent 415, the UEFI 419 may generate a segregated memory partition, such as described above, for use by the workspace 405 in configuring pre-boot variables available through the UEFI 419.

In some embodiments, the segregated memory partition created by UEFI 419 may be populated with pre-boot variables that are available for configuration using that particular isolated pre-boot space, thus limiting workspace 405 to configuration of a restricted set of all possible pre-boot variables that are available via UEFI 419. In this manner, each isolated pre-boot space is limited to providing access to pre-boot variables for which a particular workspace has been approved, such that each individual workspace is unable to access pre-boot variable settings by other workspaces, or to even view the pre-boot variable settings that are available to other workspaces. In some embodiments, the pre-boot variables populated within an isolated pre-boot space may be specified by an access control list that may specify whether a workspace is allowed access to individual pre-boot variables supported by UEFI 419 and any restrictions or limitations on allowed access. This access control list may be initially provided by the workspace orchestration service 420 as part of the workspace definition that also includes the notification of the isolated pre-boot space that has been mapped for use by workspace 405. In addition to providing an access control list, the workspace orchestration service 420 may also provide each isolated pre-boot space with a shared update key for use in transmitting updated access control information to the isolated pre-boot space.

With the workspace 405 deployed and in use, at 455, the workspace 405 issues a request for configuration of a pre-boot resource of the IHS. As described with regard to FIG. 3B, workspaces 331A-N that are configured and deployed according to embodiments may utilize pre-boot client 335A-N for use in interoperating with the local workspace management agent 332 in interfacing with pre-boot resources of the IHS, such as UEFI configurations, that are otherwise unavailable due to the isolation of the workspace from all or part of the hardware and software of the IHS. Configured in this manner, workspaces 405 remain isolated from each other and from directly accessing UEFI 419, and instead rely on capabilities of a trusted workspace management agent 415, which may include a pre-boot agent, in order to configure pre-boot resources that have been made available to workspace 405.

In some embodiments, the workspace 405 may include a unique isolated pre-boot space identifier in its request, at 455, for configuration of a pre-boot resource. In such instances, this unique identifier presented by the workspace 405 may be an identifier that was included in the workspace definition that was generated by the workspace orchestration service 420 and used to configure workspace 405. In some embodiments, the unique identifier provided to the workspace 405 may be calculated by the orchestration service 420 based on characteristics of workspace 405, thus binding the unique identifier for use by that particular workspace such that any attempts to utilize the unique identifier by other workspaces are detectable. By presenting this unique identifier in its request for use of a pre-boot resources that are being made available by an IPS, the UEFI 419 may validate that the request originates from an authentic workspace that is operating using a workspace definition generated by the workspace orchestration service 420 and may also validate that this particular workspace 405 has been assigned use of the IPS that is identified in the request.

As indicated in FIG. 4, at 455, the request for configuration of a pre-boot resource by workspace 405 may be transmitted from the workspace 405 to the workspace management agent 415, that may rely on a pre-boot agent 418 to issue the request to UEFI 419. Based on unique identifier associated with the requesting workspace 405, at 460, UEFI 419 may identify the isolated pre-boot space that has been specified for use by this particular workspace 405. In some embodiments, if no mapping of an isolated space is identified for the requested workspace 405, the UEFI 419 may generate an error or alert specifying an unauthorized attempt by the workspace 405 to access a pre-boot resource. If a mapping to a configured isolated pre-boot space is identified for the requesting workspace 405, the UEFI 419 may evaluate the request against the pre-boot variables that are available for use by the workspace 405 and that have been used to populate isolated pre-boot space. If the UEFI 419 detects an attempt by the workspace 405 to configure a pre-boot resource that has not been allowed for use by the workspace, and thus does not correspond to a pre-boot variable that has been populated in the isolated pre-boot space, the UEFI 419 may generate an error or alert specifying an unauthorized by the workspace 405 to access a pre-boot source. Otherwise, if the workspace 405 is allowed use of the pre-boot resource, the UEFI 419 makes the requested configuration of the pre-boot resource on behalf of the workspace.

In this manner, a workspace 405 may be allowed to initiate operations by pre-boot resources of UEFI 419, while maintaining isolation from other workspaces. For instance, UEFI 419 may support various power mode settings for IHS and for devices coupled to an IHS, such as display devices and game controllers. In one scenario, workspace 405 may be generated for gameplay using a gaming controller that may be configured through pre-boot variables supported by UEFI 419. In existing systems, workspaces may be precluded from accessing power mode controls for the game controller that are supported by UEFI 419. In embodiments, however, workspace 405 may issue a request for modifying a power mode setting for the game controller via the pre-boot variables supported by UEFI 419, such as in response to determining a user is no longer engaged in game play. In other embodiments, a workspace 405 may similarly request modification of power mode settings for the IHS. For instance, based on user inputs to the workspace or based on a lack of user inputs, workspace 405 may issue a request for transitioning the IHS to a low-power setting. In another example, workspace 405 may issue a request for configuration of a pre-boot variable maintained by UEFI 419 that specifies a preference for supporting high-performance computing using all available battery power, such as in order to support a high priority function by the workspace 405.

In another example, UEFI 419 may support pre-boot variables that may be used to enable and disable I/O capabilities of the IHS, such as enabling and disabling I/O ports of the IHS. For instance, a workspace 405 that is launched to provide access to highly protected data may require that available security precautions be initiated by IHS in order to improve the security context in which access to the data will be provided. In such instances, a workspace 405 may issue requests for disabling of an I/O port, such as a USB port or an audio port, through configuration of pre-boot variables supported by UEFI 419. In the same manner, workspace 405 may issue a request for limiting use of an I/O port, such as a USB-C port, to power transfers and thus preventing data transmissions via the I/O ports. In another example, workspace 405 may issue a request for limiting use of an I/O port, such as a USB-C port, as a display port, with all other data and power transfers prohibited. In another example, workspace 405 may issue a request for rebooting an I/O port prior to using the I/O port for use in a data transmission.

In another example, UEFI 419 may support pre-boot variables that may be used by workspace 405 to enable and disable privacy capabilities implement using I/O devices that are coupled to the IHS. For instance, workspace 405 that is launched to provide access to highly protected data may request that a privacy shield capability of a display device of the IHS be initiated. In this same manner, workspace 405 may request that privacy capabilities of audio input and output devices, such a muting audio and disabling audio controls, be initiated while the workspace is an operation, where such privacy capabilities may be initiated through pre-boot variables supported by UEFI 419. In another example, workspace 405 may request disabling of the camera, or other image capture capability of an IHS, through configuration of pre-boot variables supported by UEFI 419.

In this manner, workspace 405 may be provided use of pre-boot resources of an IHS, while maintaining the isolation of workspace 405 and limiting workspace 405 to accessing a limited set of the pre-boot variables that are supported by UEFI 419. As described, pre-boot variables that are made available to workspace 405 within an isolated pre-boot space may be specified by an access control list provided by workspace orchestration service 420. In some instances, the scope of pre-boot resources that are available to a particular workspace 405 may be modified by workspace orchestration service 420, such as in response to a change in the security context of the IHS and/or workspace 405. Accordingly, embodiments may continue, at 465, with the workspace orchestration service 420 generating an updated access control list for the isolated pre-boot space that is mapped to workspace 405. For example, in response to a change in security context that has been triggered by the detection of IHS being utilized in an unknown location and using an unrecognized network, workspace orchestration service 420 may modify the permissions of workspace 405 in order to allow use of additional privacy settings that are available through pre-boot variables of UEFI 419.

In some embodiments, the updated access control list transmitted to the UEFI 419, may be encrypted by the workspace orchestration service 420, thus preventing other workspaces or processes from learning the pre-boot variable settings that are being made available to the workspace 405 via the update. For instance, the workspace orchestration service 420 may digitally encrypt the updated access control list using the update key, described above, that was provided to the UEFI 419 during the initial configuration of isolated pre-boot space. During initialization of an isolated pre-boot space, the workspace orchestration service 420 may provide each isolated pre-boot space with an update key that is securely stored within the segregated memory partition that is for use by only that specific isolated pre-boot space. The workspace orchestration service 420 may retain a copy of the update key for use in encrypting updates to the isolated pre-boot spaces. Through the use of this shared update key, the workspace orchestration service 420 may transmit encrypted updates to an isolated pre-boot space such that the updates are not viewable by other workspaces operating on the IHS. Upon receiving an update access control list from the workspace orchestration service 420, the UEFI 419, at 470, may utilize the update key retrieved from the isolated pre-boot space to decrypt the update. The updated access control list may then be used by the UEFI 419, at 475, to repopulate the pre-boot variables that are available to the workspace 405 via the isolated pre-boot space. With the isolated pre-boot space populated with updated pre-boot variables, at 485, the UEFI 419 continues receiving requests from workspaces, such as via the pre-boot agent 418, for use of pre-boot resources. As described above with regard to 460, the UEFI 419 continues to process such requests by determining the isolated pre-boot space that has been mapped for use by the requesting workspace. If the isolated pre-boot space has been repopulated, the updated pre-boot variables stored in the segregated memory of the isolated pre-boot space are used to determine whether the request by the workspace 405 is allowed. Using the described embodiments, workspaces are allowed use of certain resources of an IHS, while also providing a secure way of updating the resources that an individual workspace is being allowed to access.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) supporting use of pre-boot resources of the IHS by a plurality of workspaces operating on the IHS, the IHS comprising:
   processors;

a first memory coupled to the processors, the first memory storing program instructions that, upon execution by the processors, cause the IHS to run an operating system; and a second memory coupled to the processors, the second memory storing program instructions that, upon execution by the processors, cause the IHS to:

receive a notification of an initialization of a first workspace on the IHS, wherein the notification specifies a segregated variable space for use by the first workspace;

initialize the segregated variable space and populate the segregated variable space with a plurality of pre-boot variables allowed for configuration by the first workspace, wherein the segregated variable space is populated with the pre-boot variables based on an access control list that specifies the plurality of pre-boot variables allowed for configuration by the first workspace, and wherein an update key is stored in the segregated variable space during initialization of the segregated variable space, and wherein a modification to the pre-boot variables allowed for configuration by the first workspace is decrypted using the update key;

receive, from the first workspace, a request to configure a pre-boot variable of the IHS;

identify the segregated variable space as being mapped for use by the first workspace;

determine whether the requested pre-boot variable configuration is allowed based on the pre-boot variables that are populated in the segregated variable space; and when the requested pre-boot variable configuration is allowed, configure the requested pre-boot variable on behalf of the first workspace.

2. The IHS of claim 1, wherein the segregated variable space comprises a segregated memory utilized by a UEFI (Unified Extensible Firmware Interface) of the IHS.

3. The IHS of claim 1, wherein the first workspace is limited to accessing variable information provided in the segregated variable space, and wherein other workspaces are unable to access the variable information provided in the segregated variable space.

4. The IHS of claim 2, wherein the segregated UEFI memory comprises a partition of an NVRAM (nonvolatile random-access memory) utilized by the UEFI.

5. The IHS of claim 1, wherein the configuration of the pre-boot variable requested by the first workspace comprises initiating a power mode supported by the IHS.

6. The IHS of claim 1, wherein the configuration of the pre-boot variable requested by the first workspace comprises disabling an I/O port of the IHS.

7. The IHS of claim 1, wherein the configuration of the pre-boot variable requested by the first workspace comprises initiating a privacy capability implemented by an I/O device of the IHS.

8. The IHS of claim 1, wherein the modification to the pre-boot variables allowed for configuration by the first workspace is received from a remote workspace orchestration service that initialized the first workspace on the IHS.

9. A method for supporting use of pre-boot resources of an Information Handling System (IHS) by a plurality of workspaces operating on the IHS, the method comprising:

receiving, from a remote workspace orchestration service, a notification of an initialization of a first workspace on the IHS, wherein the notification specifies a segregated variable space for use by the first workspace;

initializing the segregated variable space and populating the segregated variable space with a plurality of pre-boot variables allowed for configuration by the first workspace, wherein the segregated variable space is populated with the pre-boot variables based on an access control list that specifies the plurality of pre-boot variables allowed for configuration by the first workspace, and wherein an update key is stored in the segregated variable space during initialization of the segregated variable space, and wherein a modification to the pre-boot variables allowed for configuration by the first workspace is decrypted using the update key;

receiving, from the first workspace, a request to configure use of a pre-boot variable of the IHS;

identifying the segregated variable space as being mapped for use by the first workspace;

determining whether the first workspace is allowed to configure the requested pre-boot variable based on the pre-boot variables that are populated in the segregated variable space; and when the requested pre-boot variable configuration is allowed, configuring the requested pre-boot variable on behalf of the first workspace.

10. The method of claim 9, wherein the segregated variable space comprises a segregated memory utilized by a UEFI (Unified Extensible Firmware Interface) of the IHS.

11. The method of claim 9, further comprising: limiting the first workspace to variable information provided in the segregated variable space, and preventing other workspaces from accessing the variable information provided in the segregated variable space.

12. The method of claim 9, wherein the configuration of the pre-boot variable requested by the first workspace comprises initiating a power mode supported by the IHS.

13. The method of claim 9, wherein the configuration of the pre-boot variable requested by the first workspace comprises disabling an I/O port of the IHS.

14. The method of claim 9, wherein the configuration of the pre-boot variable requested by the first workspace comprises initiating a privacy capability implemented by an I/O device of the IHS.

15. A system supporting use of pre-boot resources of an Information Handling System (IHS) by a plurality of workspaces operating on the IHS, the system comprising:

a workspace orchestration service that is remote from the IHS and that manages deployment of workspaces on the IHS; and the IHS comprising:

a processor; and a memory coupled to the processor, the memory storing program instructions that, upon execution by the processor, cause the IHS to:

receive, from the remote workspace orchestration service, a notification of an initialization of a first workspace on the IHS, wherein the notification specifies a segregated variable space for use by the first workspace;

initialize the segregated variable space and populate the segregated variable space with a plurality of pre-boot variables allowed for configuration by the first workspace, wherein the segregated variable space is populated with the pre-boot variables based on an access control list that specifies the plurality of pre-boot variables allowed for configuration by the first workspace, and wherein an update key is stored in the segregated variable space during initialization of the segregated variable space, and wherein a modification to the pre-boot variables allowed for configuration by the first workspace is decrypted using the update key;

receive, from the first workspace, a request to configure a pre-boot resource of the IHS;

identify the segregated variable space as being mapped for use by the first workspace;

determine whether the first workspace is allowed to configure the requested pre-boot variable based on the pre-boot variables that are populated in the segregated variable space; and when access to the requested pre-boot variable is allowed, configure the requested pre-boot variable on behalf of the first workspace.

16. The system of claim 15, wherein the segregated variable space comprises a segregated memory utilized by a UEFI (Unified Extensible Firmware Interface) of the IHS.

* * * * *